(12) United States Patent
Kenny et al.

(10) Patent No.: US 7,617,153 B1
(45) Date of Patent: Nov. 10, 2009

(54) GLOBAL PROCUREMENT BYPASS SHUTDOWN PROCESS AND METHOD

(75) Inventors: Maureen Cecelia Kenny, Ft. Lauderdale, FL (US); Derek B. Faulkner, Bexleyheath (GB); Susan L. Feiner, New York, NY (US); Susan Lynn Helms, Peoria, AZ (US); Matthew Edmund Lipinski, Chanhassen, MN (US); Janice A. Meyers, Scottsdale, AZ (US); Sreepriya Chitra Narasimhan, New York, NY (US); Aparecida de Araujo Paula, São Paulo (BR); Vinod V. Poolamanna, New Delhi (IN); Mark Allen Rusch, New York, NY (US); Manfred Schnieders, Usingen (DE); Michael R. Streit, Oak Park, IL (US); Salvatore Vitale, Staten Island, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1389 days.

(21) Appl. No.: 10/325,404

(22) Filed: Dec. 19, 2002

Related U.S. Application Data

(60) Provisional application No. 60/400,858, filed on Aug. 2, 2002.

(51) Int. Cl.
*G06Q 40/00* (2006.01)
(52) U.S. Cl. .............................. 705/40; 705/38; 705/36; 705/35
(58) Field of Classification Search .............. 705/35–44, 705/22, 28
See application file for complete search history.

(56) References Cited

U.S. PATENT DOCUMENTS

| 5,287,267 | A | 2/1994 | Jayaraman et al. |
| 5,615,109 | A | 3/1997 | Eder |

(Continued)

OTHER PUBLICATIONS

Using the Internet for B2B activities: a review and future directions for research Urs E. Gattiker, Stefano Perlusz, Kristoffer Bohmann. Internet Research. Bradford: 2000. vol. 10, Iss. 2; p. 126.*

*Primary Examiner*—Frantzy Poinvil
*Assistant Examiner*—Clement Graham
(74) *Attorney, Agent, or Firm*—Fitzpatrick, Cella, Harper & Scinto

(57) ABSTRACT

The present invention provides a bypass shutdown process and method to implement change across an organization to help ensure that the procurement of goods and services is done through specifically approved suppliers, and according to appropriate procurement procedures. In a preferred embodiment, the bypass shutdown process and method comprises the steps of determining whether an invoice is from an approved supplier; determining whether the invoice relates to a targeted commodity; determining whether the related purchase was transacted prior to commodity roll-out; determining whether the transaction is exempt from penalty assessment; determining whether the purchaser previously submitted a bypass invoice; recording said invoice in a selected database; determining whether the purchaser has exceeded a penalty threshold level of non-compliance; generating a warning communication regarding an organization bypass process initiative and sending the warning communication to the purchaser; and assessing a penalty to the purchaser, or purchaser's business unit, cost center, department, division, or any other sub-unit of an organization, upon exceeding the penalty threshold.

35 Claims, 2 Drawing Sheets

U.S. PATENT DOCUMENTS

| | | |
|---|---|---|
| 5,675,745 A | 10/1997 | Oku et al. |
| 5,721,913 A | 2/1998 | Ackroff et al. |
| 5,914,472 A | 6/1999 | Foladare et al. |
| 5,970,465 A | 10/1999 | Dietrich et al. |
| 5,970,475 A | 10/1999 | Barnes et al. |
| 6,014,644 A | 1/2000 | Erickson |
| 6,044,357 A | 3/2000 | Garg |
| 6,128,602 A | 10/2000 | Northington et al. |
| 6,138,103 A | 10/2000 | Cheng et al. |
| 6,216,109 B1 | 4/2001 | Zweben et al. |
| 6,356,880 B1 | 3/2002 | Goossens et al. |
| 6,370,573 B1 | 4/2002 | Bowman-Amuah |
| 6,411,961 B1 | 6/2002 | Chen |
| 6,430,539 B1 | 8/2002 | Lazarus et al. |
| 2001/0011222 A1 | 8/2001 | McLauchlin et al. |
| 2002/0002579 A1 | 1/2002 | Holden et al. |
| 2002/0010525 A1 | 1/2002 | Radjy et al. |
| 2002/0046081 A1 | 4/2002 | Albazz et al. |
| 2002/0052801 A1 | 5/2002 | Norton et al. |
| 2002/0065736 A1 | 5/2002 | Willner et al. |
| 2002/0069175 A1 | 6/2002 | Burich |
| 2002/0072986 A1 | 6/2002 | Aram |
| 2002/0082968 A1 | 6/2002 | Knowles et al. |
| 2002/0087372 A1 | 7/2002 | Maresca et al. |
| 2002/0087419 A1 | 7/2002 | Andersson et al. |
| 2002/0099585 A1 | 7/2002 | Locke |
| 2002/0103661 A1 | 8/2002 | Albazz et al. |
| 2002/0107713 A1 | 8/2002 | Hawkins |
| 2002/0128890 A1 | 9/2002 | Dick et al. |
| 2002/0128953 A1 | 9/2002 | Quallen et al. |
| 2002/0133470 A1 | 9/2002 | Gruber |
| 2003/0083947 A1* | 5/2003 | Hoffman et al. ............... 705/22 |
| 2003/0130878 A1* | 7/2003 | Kruk et al. ..................... 705/7 |

* cited by examiner

GLOBAL PROCUREMENT BYPASS SHUTDOWN PROCESS AND METHOD

REFERENCE TO RELATED APPLICATIONS

This application claims the benefit of the filing date of U.S. Provisional Patent Application No. 60/400,858, filed on Aug. 2, 2002.

FIELD OF THE INVENTION

The present invention relates generally to procurement processes. More particularly, the present invention relates to procurement processes having a bypass shutdown process and method that encourages or ensures that the procurement of indirect goods and services is carried out through approved suppliers via appropriate and designated procurement systems and procedures.

BACKGROUND OF THE INVENTION

Companies and organizations have been aggressively seeking to control spending on indirect goods and services for many years. Existing methods and systems to control spending have often been less than adequate. Often times, the failure to adequately control spending is due to the lack of appropriate technological infrastructure in an organization, lack of centralized global or company wide procurement procedures, and/or the lack of or poorly codified penalty systems for enforcing desired procurement behaviors and processes.

Companies and organizations typically have approved vendors and suppliers for goods and services. The intent is that by purchasing goods and services from a limited set of approved vendors and suppliers, companies and organizations receive pre-negotiated, discounted prices for those same goods and services, which typically are substantially less than the prevailing market prices for those same goods and services. Although in some cases employees may follow an organization's preferred procurement procedures, in many cases employees do not.

There are a variety of situations where an organization's preferred procurement procedures are not followed, either inadvertently or intentionally. For example, necessary goods or services may have been exhausted and employees faced with pressing deadlines may feel it is too time consuming or inconvenient to follow the established procurement process, so the employees purchase goods and services in a manner that is in violation of standard procurement procedures. Alternatively, an employee or department may not be entirely informed about a company's procurement procedures and inadvertently purchase needed goods or services in violation of the procurement procedures.

Other reasons that employees or departments may purchase outside the normal procurement procedures include personal or departmental biases for certain goods or services, established personal or departmental purchasing habits, historical relationships with certain suppliers other than those selected by the organization, or belief and reliance on an idea that the end users are better educated to make purchase decisions on certain specialized goods and services.

Depending on the size of an organization or company, purchase of goods and services outside of standard procurement procedures, from non-approved suppliers, can result in an organization paying substantially more for those goods and services than would have been paid through established company procurement procedures, from approved suppliers.

In the aggregate, the purchase of goods and services outside normal procurement procedures leads to higher costs for the organization, a direct result of the loss of savings from discounted prices which would have been realized, had approved procedures had been followed. The higher cost of good and services in these cases can be due to the purchases of the goods and services at retail prices, unrealized savings that could have been achieved by negotiating discounts for meeting volume thresholds with preferred suppliers or vendors, and/or penalties for not meeting minimum contractual volume commitments. The higher costs paid for goods and services have a detrimental impact on an organization's operating expenses.

Further, continued buying of goods and services in violation of a company's procurement policies and procedures could lead to diminished morale and productivity for those employees or personnel in a department charged with carrying out the purchasing needs of the company, e.g., a purchasing department.

There is thus a need for an improved and efficient procurement method and system where individuals and departments with purchasing authority in an organization are motivated and encouraged to follow and use designated procurement processes and procedures to procure designated goods and services from preferred suppliers and thereby maximize an organization's use of funds and resources.

SUMMARY OF THE INVENTION

The present invention provides a by pass shutdown method for driving behavioral change across an organization by assessing penalties to individuals, cost centers, and other organizational sub-units, through a bypass shutdown process and method, which ensures that the procurement of indirect goods and services is done through specifically approved suppliers, and through appropriate procurement systems. The bypass shutdown process and method uses a systemic approach, consisting of organization-wide, senior management communications and mandates, e-procurement processes, invoice process flows, warning communications from senior management and assessment of penalties, to motivate desired and appropriate spending behavior on the part of individuals, departments, and other organizational sub-units. The bypass shutdown process and method can be used with manual procurement processes, as well as computerized and/or web-based procurement systems. The implementation of the bypass shutdown process and method will result in centralized procurement spending for indirect goods and services throughout a company or organization that is efficient and cost-effective.

An embodiment of the bypass shutdown process and method comprises the steps of: a) determining whether a received invoice, whether in electronic, paper or other form, is from an approved supplier; b) if said invoice is not from an approved supplier, determining whether said invoice involves a targeted commodity; c) if said invoice relates to a targeted commodity, determining whether said invoice purchase transaction was conducted prior to commodity roll-out; d) determining whether the transaction is exempt from penalty assessment; e) recording said invoice in a selected database; f) determining whether an approver of said received invoice has previously submitted a bypass invoice; g) if said approver has previously submitted a bypass invoice, determining whether said approver has exceeded a penalty threshold level; h) generating a warning communication regarding a bypass process initiative and sending said warning communication to said approver if said approver has not previously submitted a bypass invoice or has not exceeded said penalty threshold level; and i) assessing a penalty to approver, or approver's business unit, cost center, department, division, or any other sub-unit of an organization, if said penalty threshold has been exceeded.

It is an object of the present invention to provide a bypass shutdown process and method that ensures that those individuals who purchase goods and services, including indirect goods and services, do so only through authorized suppliers and through appropriate procurement systems and procedures.

It is an object of the present invention to provide a bypass shutdown process and method that will result in savings in the procurement of indirect goods and services for an organization.

It is an object of the present invention to provide a bypass shutdown process and method that can overcome change management issues encountered in motivating business units and their personnel to change purchasing behaviors and relationships through the use of a penalty system.

It is an object of the present invention to provide a bypass shutdown process and method that includes educational communications, warning communications and financial penalties to motivate desired spending or purchasing behavior, and to reinforce an organization's designated procurement plan and procedures.

It is an object of the present invention to provide a bypass shutdown process and method that will create incremental savings for an organization by increasing the percentage of spend that is channeled to preferred suppliers, where said organization has pre-negotiated, discounted pricing structures.

It is an object of the present invention to provide a bypass shutdown process and method that can address change management issues by motivating business units and/or individuals to align their procurement and purchasing behavior with those of the organization.

It is an object of the present invention to provide a bypass shutdown process and method that substantially reduces spending outside an organization's established procurement processes through a systemic and codified bypass shutdown initiative.

It is an object of the present invention to provide a bypass shutdown process and method that comprises organization-wide, senior management communications and mandates, e-procurement processes, invoice process flows, warning communications from senior management and assessment of penalties to motivate desired and appropriate spending behavior by individuals, departments, cost centers, subsidiaries, or other spending groups within an organization.

It is an object of the present invention to provide a bypass shutdown process and method that comprises a "penalty" or "penalty assessment" system to provide incentives for business units, cost centers, departments, or individuals to comply with desired organization or company procurement initiatives.

It is an object of the present invention to provide a bypass shutdown process and method where business units, cost centers, departments and individuals may be assessed monetary penalties against their budgets if the business unit, cost center, department or individual continue to purchase or procure goods and services from unauthorized suppliers or by unauthorized methods after a training and education process and a predetermined number of warnings.

It is an object of the present invention to provide a bypass shutdown process and method where portions of savings realized as a result of bypass reduction may be rewarded or credited back to compliant business units, departments or cost centers as an added incentive to comply with bypass shutdown initiatives.

It is an object of the present invention to provide a bypass shutdown process and method that can result in centralized procurement spending throughout a company or organization that is efficient and cost-effective.

It is an object of the present invention to provide a bypass shutdown process and method that can be implemented with manual procurement processes, as well as with computerized, web-based, and/or networked procurement systems.

It is an object of the present invention to provide a bypass shutdown process and method that can substantially reduce maverick spending in an organization in order to maximize the value of an organization's procurement-related resources.

The following drawings and description set forth additional advantages and benefits of the invention. More advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION

The bypass shutdown process and method can be used with procurement systems and procedures to ensure that an employee, department or other responsible group in a company who procures goods and services does so only from approved suppliers, and only through appropriate procurement systems and procedures. Embodiments of the bypass shutdown process and method may be implemented in organizations using manual procurement processes, as well as organizations that have implemented computerized or web-based procurement systems. The bypass shutdown process and method should address and overcome issues of change management that may be encountered in motivating business units to change their purchasing behavior and supplier relationships. Further, the bypass shutdown process and method will use a systemic approach, consisting of organization-wide, senior management communications and mandates, e-procurement processes, invoice process flows, warning communications from senior management and assessment of penalties to motivate desired and appropriate spending behavior. Business units, cost centers, departments and personnel who continue to purchase from unauthorized suppliers or by unauthorized methods will be assessed penalties for their violations, e.g., monetary penalties against a department budget. The bypass shutdown process and method will substantially reduce maverick spending and will result in a centralized procurement process that will be efficient and cost-effective, and will maximize the value of company designated procurement programs and systems by ensuring that the purchase of goods and services is carried out through approved suppliers and through appropriate procurement systems.

Figure 1A:
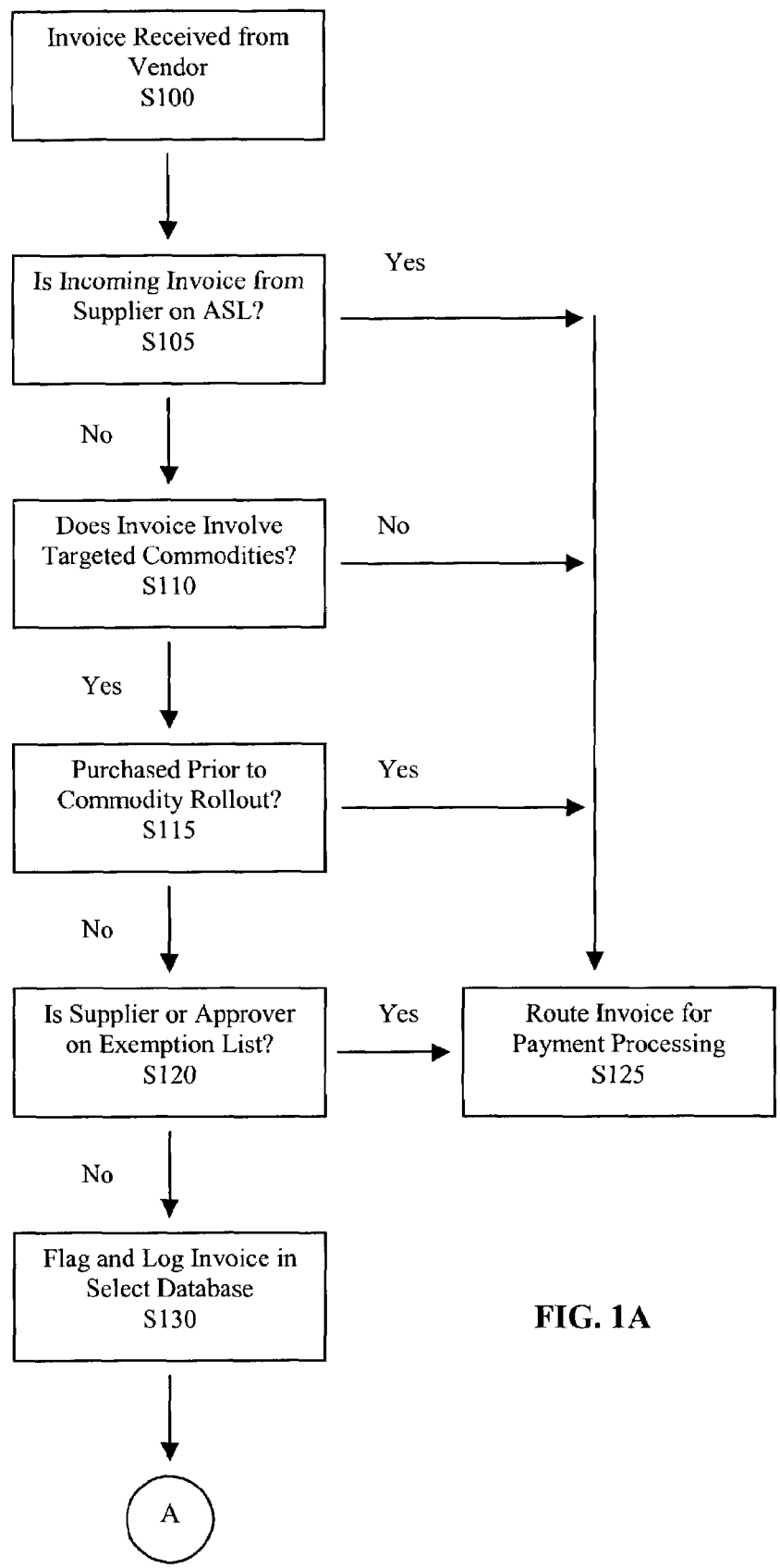
FIGS. 1A and 1B show a flow chart for the steps to implement a bypass shutdown process and method in conjunction with a company's or organization's established procurement procedures, according to an embodiment of the present invention.
Figure 1B:
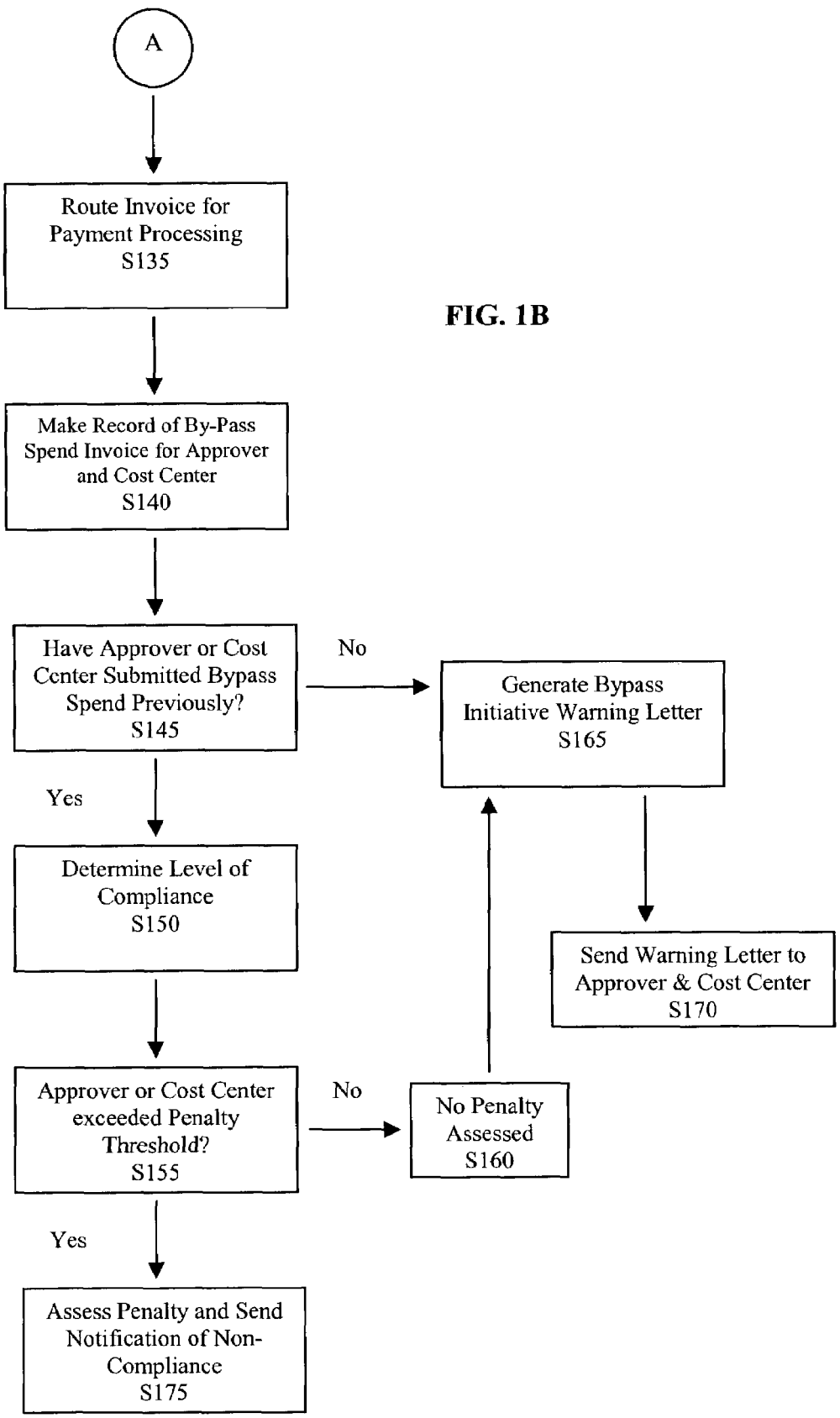

FIGS. 1A and 1B illustrate a flow diagram for a preferred embodiment of a global bypass shutdown process and method that can be implemented in a procurement system according to the present invention. The process illustrated is preferably used with procurement systems that are computer based and that have Internet or web-based procurement applications, and further with personnel and organizations that can communicate electronically via computers in internal and external networks or over a telephone or telecommunications systems. Further, the procurement system may be either an open or a secure procurement system with selected authorized personnel. It should be understood that throughout this specification the terms organization, company and corporation may be used interchangeably.

In Step S100, incoming or received invoices for payment of purchased goods and services are routed to an accounts payable department or organization for payment processing of the received invoice. In one embodiment, incoming invoices may relate specifically to the procurement of indirect goods and services, but invoices may also relate to other types of goods and services as well.

In Step S105, a determination is made whether the received invoice is from a supplier or vendor that has been approved to do business with the organization. For example, a supplier or vendor that is on an organization's approved supplier list (ASL). Such suppliers or vendors typically have purchasing agreements in place with the paying organization that are mutually beneficial. In Step S125, if the received invoice is from an approved supplier, the invoice is preferably routed for payment processing by an appropriate person or department in the organization or company.

In Step S110, if the invoice is not from a supplier or vendor that has been approved to do business with the organization, a determination is made as to whether the received invoice relates to or involves goods or services that are designated targeted commodities by the organization. For example, target commodities could include, among others, commercial print, technologies hardware, temporary agencies, Information Technology (IT) consulting, IT contractors, Software, Office Supplies, out-sourced services, database management, telecommunication services and infrastructure, etc. Targeted commodities may be goods or services that the organization or company has identified as commodities where substantial procurement savings may be realized by reaching mutually beneficial purchase agreements with suppliers of those goods or services. For example, substantial savings and discount may be realized by purchasing all of an organization's computers or office supply needs from a single supplier at discounted or near wholesale prices instead of simply purchasing the goods or services from a variety of supplier or from retail providers. If the invoice does not involve a targeted commodity, then the invoice is preferably routed for payment processing in Step S125.

In Step S115, a determination can be made as to whether the goods or services were purchased prior to "commodity roll-out" or an official communication to the organization's employees that the commodity involved was being designated as a targeted commodity by the company or organization. In this manner, personnel or departments who authorized the goods or services billed on the received invoice will preferably only be assessed a penalty if the authorization for the goods and services happened after the commodity roll-out. If the goods or services were purchased prior to the commodity rollout, then the invoice is preferably routed for payment processing in Step S125.

In Step S120, if the goods or services were purchased after commodity rollout, then a determination is made whether the supplier, purchase approver, or department or cost center approver that authorized the purchase are on an exemption list or are exempt from the penalty assessment. In this manner, individuals and departments in an organization not able to abide by the designated procurement systems and procedures are exempt from penalty assessment. The select individuals and departments are preferably added to an exemption list for this purpose. When the individuals, departments and suppliers obtain the ability to abide by the organization's procurement procedures, they will be removed from the exemption list and then be subject to penalty assessments for any purchase violations. If the supplier, approver, or cost center are on an exemption list, the invoice is preferably routed for payment processing in Step S125. If the supplier, individual approver, or department or cost center approver are not on the exemption list, the invoice relates to goods and/or services that were purchased outside the organization's preferred or mandated procurement system or procedures. The purchase is therefore classified as non-compliant, "bypass" spend, and as a result of the purchase, the company will not benefit from potential savings that would have been realized through the purchase of the goods or services at discounted pricing structures via the organization's approved procurement channels and procedures. In a preferred embodiment, the term "bypass" or "maverick" refers to purchases via non-approved suppliers or via non-approved procedures. However, those of skill in the art will recognize that other terms may be used to designate purchases via non-approved suppliers or procedures.

In Step S130, the invoice is preferably flagged, logged and stored in a database. The database can be any database and database system well known to those of skill in the art. For example, the database system could be Microsoft Access, Corel Paradox, Lotus Approach, IBM Database II-IV, Sybase, etc. By storing invoice information in a database, records of invoices from this supplier can be kept for future reference. Further, the recorded information can also include the names and contact information of individuals or departments who authorized or approved the purchase of the goods, services or commodities appearing on the invoice. The recorder information can be useful in tracking purchases outside the proper procurement channels and procedures.

In Step S135, the invoice is preferably routed for payment processing.

Next, a determination is preferably made as to whether or not a penalty should be assessed for deviation from established company or organization procurement procedures. In Step S140, a record is created or an association is made between the bypass-related invoice and the individual or department, unit or cost center that was responsible for approving the purchase of the goods and services on the invoice. This information can be stored in a database for future access and referenced in the determination of penalty assessments for purchase violations.

In Step S145, a determination is preferably made as to whether the approver and/or cost center have previously submitted a bypass spend invoice. This determination may be useful in making a determination of the type of penalty or magnitude of penalty that should be assessed. A person, department or cost center who has not previously submitted a bypass spend invoice may receive a lighter and different penalty than a repeat bypass spend offender.

If the approver and/or cost center have not previously submitted a bypass spends invoice, then preferably a warning letter or correspondence regarding the company's by-pass initiative is generated in Step S165. In Step S170, a copy of the bypass invoice and of the warning letter is sent to the individual or cost center that approved the purchase transaction. A record can also be made and stored of the correspondence sent and to whom it was sent.

In Step S150, if the approver and/or cost center have previously submitted a bypass spend invoice, then a determination is preferably made as to whether the approver or cost center have exceeded a pre-determined limit or threshold where a penalty will be assessed against the approver and/cost center. For example, if the penalty threshold level is a total of three bypass spend transactions, then the determination would be whether the approver or cost center have exceeded three bypass spend transactions previously without a penalty. Those of skill in the art will readily appreciate that the penalty threshold level is a flexible level that is set by an organization to apply to their specific needs or organization culture and customs.

In Step S155, if the approver or cost center have not exceeded the pre-determined limit or threshold for a penalty, then preferably no penalty is assessed at this time against the approver and/cost center (Step S160) and a warning letter or correspondence regarding the company's by-pass initiative is generated in Step S165. In Step S170, a copy of the bypass invoice and of the warning letter is sent to the individual or cost center that approved the purchase transaction. The warning communication may further include information or notice to the approver that there have been previous bypass spend violations and that the approver may be nearing a penalty threshold where a penalty may be assessed against the approver. A record can also be made and stored of the warning correspondence sent and to whom it was sent.

In Step S175, if the approver or cost center have exceeded the pre-determined limit or threshold for a penalty, then the approver and/or cost center is assessed a penalty. The actual penalty assessed to the approver or cost-center may vary depending on the amount of the bypass violation and the types of penalties set up by the organization. The organization may decide to implement a sliding penalty scale. For example, if this bypass transaction is the approver's or cost center's fourth bypass invoice, i.e., one over the limit, a light penalty may be assessed. In contrast, if this is the approver's or cost centers' tenth violation a more severe penalty may be assessed. Alternatively, the same light or harsh penalty may be given to everyone over a defined penalty threshold.

Those of skill in the art will recognize that the penalty may be take on any desired form that an organization has determined can serve to encourage, motivate or provide incentive to violators to use the company's approved procurements systems and procedure. For example, assuming the penalty threshold was exceeded, the penalty could be assessing a monetary penalty, e.g., $1000 for each violation over the threshold, curtailing purchasing privileges, eliminating company perks, reducing a violator's budget, providing public postings or company announcement of bypass spenders, or implementing any other type of penalty that could appropriately motivate individual, departments or cost center use company approved procurement systems and procedures.

The invention has been described and illustrated with respect to certain preferred embodiments by way of example only. Those skilled in that art will readily recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

We claim:

1. A computer-readable medium having stored thereon sequences of instructions, the sequences of instructions including instructions which when executed by a computer system causes the computer system to perform:

recording, in the memory, data representing an approved supplier list, an approved commodity list, a time of a roll-out of a targeted commodity, a total number of non-compliant transactions approved by an approver, and a predetermined penalty threshold based on a number of non-compliant purchase transactions approved by the approver;

receiving an invoice for payment of a purchase transaction including a supplier identifier, a commodity identifier, and a time of the purchase transaction, the purchase transaction being approved by the approver;

comparing the supplier identifier with the approved supplier list;

comparing the commodity identifier with the approved commodity list;

comparing the time of transaction with the time of the roll-out of the targeted commodity;

comparing the total number of non-compliant transactions approved by the approver to the predetermined penalty threshold;

determining, based on the comparing of the supplier identifier, whether the invoice is from an approved supplier listed on the approved supplier list;

determining, based on the comparing of the commodity identifier, whether the invoice relates to the targeted commodity listed on the approved commodity list;

determining, based on the comparing of the time of the purchase transaction, whether the purchase transaction was conducted prior to the roll-out of the targeted commodity;

determining, based on the comparing of the total number of non-compliant transactions, whether the predetermined penalty threshold has been exceeded; and if: (1) the invoice is not from an approved supplier listed on the approved supplier list, (2) the invoice relates to the targeted commodity listed on the approved commodity list, (3) the purchase transaction was conducted subsequent to the roll-out of the targeted commodity, and (4) the penalty threshold has been exceeded:

generating a penalty notification; and transmitting the penalty notification to at least one of the approver, a business unit of the approver, a cost center, a department, a division, and an approving organization sub-unit via a communication network.

2. The computer-readable medium of claim 1, wherein the method further comprises routing the received invoice for payment processing.

3. The computer-readable medium of claim 1, wherein the received invoice relates to the purchase of indirect goods.

4. The computer-readable medium of claim 1, wherein the penalty notification is associated with a financial penalty assessment.

5. The computer-readable medium of claim 1, wherein the penalty notification is neither generated nor transmitted if at least one of a supplier associated with the supplier identifier, the approver, a business unit of the approver, a cost center, a department, a division, and an approving organization sub-unit are on an exemption list.

6. The computer-readable medium of claim 1, wherein the received invoice is in electronic form or paper form.

7. An apparatus comprising a processor and a memory storing a program executable by the processor, wherein the program includes computer code for implementing a method for assessing a penalty in a procurement system, the method comprising:

recording, in the memory, data representing an approved supplier list, an approved commodity list, a time of a roll-out of a targeted commodity, a total number of non-compliant transactions approved by an approver, and a predetermined penalty threshold based on a number of non-compliant purchase transactions approved by the approver;
receiving an invoice for payment of a purchase transaction including a supplier identifier, a commodity identifier, and a time of the purchase transaction, the purchase transaction being approved by the approver;
comparing the supplier identifier with the approved supplier list;
comparing the commodity identifier with the approved commodity list;
comparing the time of transaction with the time of the roll-out of the targeted commodity;
comparing the total number of non-compliant transactions approved by the approver to the predetermined penalty threshold;
determining, based on the comparing of the supplier identifier, whether the invoice is from an approved supplier listed on the approved supplier list;
determining, based on the comparing of the commodity identifier, whether the invoice relates to the targeted commodity listed on the approved commodity list;
determining, based on the comparing of the time of the purchase transaction, whether the purchase transaction was conducted prior to the roll-out of the targeted commodity;
determining, based on the comparing of the total number of non-compliant transactions, whether the predetermined penalty threshold has been exceeded; and
if: (1) the invoice is not from an approved supplier listed on the approved supplier list,
(2) the invoice relates to the targeted commodity listed on the approved commodity list,
(3) the purchase transaction was conducted subsequent to the roll-out of the targeted commodity, and
(4) the penalty threshold has been exceeded:
generating a penalty notification; and
transmitting the penalty notification to at least one of the approver, a business unit of the approver, a cost center, a department, a division, and an approving organization sub-unit via a communication network.

8. The apparatus of claim 7, wherein the method further comprises routing the received invoice for payment processing.

9. The apparatus of claim 7, wherein the received invoice relates to the purchase of indirect goods.

10. The apparatus of claim 7, wherein the penalty notification is associated with a financial penalty assessment.

11. The apparatus of claim 7, wherein the penalty notification is neither generated nor transmitted if at least one of a supplier associated with the supplier identifier, the approver, a business unit of the approver, a cost center, a department, a division, and an approving organization sub-unit are on an exemption list.

12. The apparatus of claim 7, wherein the received invoice is in electronic form or paper form.

13. The apparatus of claim 7, wherein the targeted commodity is at least one of a commercial print, technologies hardware, temporary agencies, information technology consulting, information technology contractors, software products, office supplies, out-sourced services, database management, and telecommunication services and infrastructure.

14. An apparatus comprising a processor and a memory storing a program executable by the processor, wherein the program includes computer code for implementing a method for eliminating bypass spending in an organization, the method comprising:
recording, in the memory, data representing an approved supplier list, an approved commodity list, a time of a roll-out of a targeted commodity, a total number of non-compliant transactions approved by an approver, and a predetermined penalty threshold based on a number of non-compliant purchase transactions approved by the approver;
receiving an invoice for payment of a purchase transaction including a supplier identifier, a commodity identifier, and a time of the purchase transaction, the purchase transaction being approved by the approver;
comparing the supplier identifier with the approved supplier list;
comparing the commodity identifier with the approved commodity list;
comparing the time of transaction with the time of the roll-out of the targeted commodity;
comparing the total number of non-compliant transactions approved by the approver to the predetermined penalty threshold;
determining, based on the comparing of the supplier identifier, whether the invoice is from an approved supplier listed on the approved supplier list;
recording the invoice in a database;
determining, based on the comparing of the commodity identifier, whether the invoice involves the targeted commodity listed on the approved commodity list;
determining, based on the comparing of the time of the purchase transaction, whether the purchase transaction was conducted prior to the roll-out of the targeted commodity;
determining, based on the comparing of the total number of non-compliant transactions, whether the approver has previously approved a non-compliant transaction and whether the predetermined penalty threshold has been exceeded;
if the approver has not previously approved a non-compliant transaction or the penalty threshold has not been exceeded:
generating a warning communication regarding a bypass process initiative and sending the warning communication to the approver via a communication network; and
if (1) the invoice is not from an approved supplier listed on the approved supplier list,
(2) the invoice relates to the targeted commodity listed on the approved commodity list,
(3) the purchase transaction was conducted subsequent to the roll-out of the targeted commodity,
(4) the approver has previously approved a non-compliant transaction, and
(5) the penalty threshold has been exceeded:
generating a penalty notification, and
transmitting the penalty notification to the approver via the communication network.

15. The apparatus of claim 14, wherein the method further comprises routing the received invoice for payment processing.

16. The apparatus of claim 14, wherein the received invoice relates to a purchase of indirect goods.

17. The apparatus of claim 14, wherein at least one of the warning communication and the penalty notification is further transmitted to at least one of a business unit of the approver, a cost center, a department, a division, and an approving organization sub-unit via the communication network.

18. The apparatus of claim 14, wherein the penalty notification is associated with a financial penalty assessment.

19. The apparatus of claim 14, wherein the penalty notification is neither generated nor transmitted if at least one of a supplier associated with the supplier identifier, the approver, a business unit of the approver, a cost center, a department, a division, and an approving organization sub-unit are on an exemption list.

20. The apparatus of claim 14, wherein the received invoice is in at least one of electronic form and a paper form.

21. An apparatus comprising a processor and a memory storing a program executable by the processor, wherein the program includes computer code for implementing a method for eliminating bypass spending in an organization, the method comprising:
  recording, in the memory, data representing an approved supplier list, an approved commodity list, a time of a roll-out of a targeted commodity, a total number of non-compliant transactions approved by an approver, and a predetermined penalty threshold based on a number of non-compliant purchase transactions approved by the approver;
  receiving an invoice for payment of a purchase transaction including a supplier identifier, a commodity identifier, and a time of the purchase transaction, the purchase transaction being approved by the approver;
  comparing the supplier identifier with the approved supplier list;
  comparing the commodity identifier with the approved commodity list;
  comparing the time of transaction with the time of the roll-out of the targeted commodity;
  comparing the total number of non-compliant transactions approved by the approver to the predetermined penalty threshold;
  determining, based on the comparing of the supplier identifier, whether the invoice is from an approved supplier listed on the approved supplier list;
  determining, based on the comparing of the commodity identifier, whether the invoice relates to the a targeted commodity listed on the approved commodity list;
  determining, based on the comparing of the time of the purchase transaction, whether the purchase transaction was conducted prior to the roll-out of the targeted commodity;
  recording the invoice in a selected database;
  determining, based on the comparing of the total number of non-compliant transactions, whether the approver has previously approved a non-compliant transaction and whether the predetermined penalty threshold has been exceeded; and
  if (1) the invoice is not from an approved supplier listed on the approved supplier list,
  (2) the invoice relates to the targeted commodity listed on the approved commodity list,
  (3) the purchase transaction was conducted subsequent to the roll-out of the targeted commodity, and
  (4) the penalty threshold has been exceeded:
    generating a penalty notification, and
    transmitting the penalty notification to the approver via a communication network.

22. The apparatus of claim 21, wherein the method further comprises routing the received invoice for payment processing.

23. The apparatus of claim 21, wherein the received invoice relates to a purchase of indirect goods.

24. The apparatus of claim 21, wherein the penalty notification is further transmitted to at least one of a business unit of the approver, a cost center, a department, a division, and an approving organization sub-unit.

25. The apparatus of claim 21, wherein the penalty notification is associated with a financial penalty assessment.

26. The apparatus of claim 21, wherein the penalty notification is neither generated nor transmitted if at least one of a supplier associated with the supplier identifier, the approver, a business unit of the approver, a cost center, a department, a division, and an approving organization sub-unit are on an exemption list.

27. The apparatus of claim 21, wherein the received invoice is in at least one of an electronic form and a paper form.

28. The apparatus of claim 21, wherein the targeted commodity is at least one of a commercial print, technologies hardware, temporary agencies, information technology consulting, information technology contractors, software products, office supplies, out-sourced services, database management, and telecommunication services and infrastructure.

29. An apparatus comprising a processor and a memory storing a program executable by the processor, wherein the program includes computer code for implementing a method for assessing a penalty in a procurement system, the method comprising:
  recording, in the memory, data representing an approved supplier list, an approved commodity list, a time of a roll-out of a targeted commodity, a total number of non-compliant transactions approved by an approver, and a predetermined penalty threshold based on a number of non-compliant purchase transactions approved by the approver;
  receiving an invoice for payment of a purchase transaction including a supplier identifier, a commodity identifier, and a time of the purchase transaction, the purchase transaction being approved by the approver;
  comparing the supplier identifier with the approved supplier list;
  comparing the commodity identifier with the approved commodity list;
  comparing the time of transaction with the time of the roll-out of the targeted commodity;
  comparing the total number of non-compliant transactions approved by the approver to the predetermined penalty threshold;
  determining, based on the comparing of the supplier identifier, whether the invoice is from an approved supplier listed on the approved supplier list;
  determining, based on the comparing of the commodity identifier, whether the invoice relates to the targeted commodity listed on the approved commodity list;
  determining, based on the comparing of the time of the purchase transaction, whether the purchase transaction was conducted prior to the roll-out of the targeted commodity;
  determining whether the purchase transaction is exempt from penalty assessment;
  determining, based on the comparing of the total number of non-compliant transactions, whether the approver has previously approved a non-compliant transaction and whether the predetermined penalty threshold has been exceeded;
  if the approver has not previously approved a non-compliant transaction or the penalty threshold has not been exceeded:

generating a warning communication regarding a bypass process initiative and sending the warning communication to the approver via a communication network; and if (1) the invoice is not from an approved supplier,
(2) the invoice relates to the targeted commodity listed on the approved commodity list,
(3) the purchase transaction was conducted subsequent to the roll-out of the targeted commodity,
(4) the approver has previously approved a non-compliant transaction,
(5) the purchase transaction is not exempt from penalty assessment, and
(6) the penalty threshold has been exceeded:
generating a penalty notification, and
transmitting the penalty notification to the approver via the communication network.

30. The apparatus of claim 29, wherein the method further comprises:
recording the invoice in a selected database if the supplier is not an approved supplier listed on the approved supplier list; and
routing the invoice for payment processing.

31. The apparatus of claim 29, wherein the received invoice relates to a purchase of indirect goods.

32. The apparatus of claim 29, wherein the approver is at least one of an individual, an employee, an approver's business unit, a cost center, a department, a division, and an approving organization sub-unit.

33. The apparatus of claim 29, wherein the penalty notification is associated with a financial penalty assessment.

34. The apparatus of claim 29, wherein the penalty notification is neither generated nor transmitted if at least one of a supplier associated with the supplier identifier, the approver, a business unit of the approver, a cost center, a department, a division, and an approving organization sub-unit are on an exemption list.

35. The apparatus of claim 29, wherein the targeted commodity is at least one of commercial print, technologies hardware, temporary agencies, information technology consulting, information technology contractors, software products, office supplies, out-sourced services, database management, and telecommunication services and infrastructure.

* * * * *

UNITED STATES PATENT AND TRADEMARK OFFICE
CERTIFICATE OF CORRECTION

| | |
|---|---|
| PATENT NO. | : 7,617,153 B1 |
| APPLICATION NO. | : 10/325404 |
| DATED | : November 10, 2009 |
| INVENTOR(S) | : Kenny et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2058 days.

Signed and Sealed this

Nineteenth Day of October, 2010

David J. Kappos
*Director of the United States Patent and Trademark Office*